United States Patent [19]

Light et al.

[11] Patent Number: 5,094,578
[45] Date of Patent: Mar. 10, 1992

[54] SELF-LOCKING RETAINER CLIP

[75] Inventors: William C. Light, Greenville; Randy A. Newsome, Tipp City, both of Ohio

[73] Assignee: Master Industries, Inc., Ansonia, Ohio

[21] Appl. No.: 650,090

[22] Filed: Feb. 4, 1991

[51] Int. Cl.⁵ .................... F16B 37/00; F16B 37/04
[52] U.S. Cl. .................................. 411/104; 411/182; 411/433; 411/508; 411/913; 248/74.5
[58] Field of Search ............... 411/104, 182, 432, 433, 411/508-510, 913; 24/297; 403/405.1, 406.1; 248/74.1, 74.2, 74.4, 74.5, 316.5

[56] References Cited

U.S. PATENT DOCUMENTS

| 4,521,148 | 6/1985 | Tanaka | 411/61 |
| 4,624,432 | 11/1986 | Salacuse | 248/74.5 |
| 4,653,716 | 3/1987 | Sakaguchi | 248/74.5 |
| 4,669,688 | 6/1987 | Itoh et al. | 24/297 |
| 4,728,071 | 3/1988 | Salacuse | 248/74.5 |
| 4,955,574 | 9/1990 | Freier | 248/316.5 |
| 4,958,791 | 9/1990 | Nakamura | 248/74.1 |

FOREIGN PATENT DOCUMENTS 1437648 6/1976 United Kingdom ............... 411/104

Primary Examiner—Neill R. Wilson
Attorney, Agent, or Firm—Barnes, Kisselle, Raisch, Choate, Whittemore & Hulbert

[57] ABSTRACT

A self-locking retainer, actuated by pushing a piece to be retained into the retainer, includes opposed molded parts hinged together, one pair of parts, on opposite sides of a hinged portion, movable together to form a base and a retention plug with integral locking dogs, and a second pair of parts mounted on the base of the first pair formed as hinged jaws with opposed recesses to clamp a piece to be retained. Detent means on the jaws and the base of the first pair of parts interlock to hold the jaws together when pushed together by a part to be retained.

8 Claims, 2 Drawing Sheets

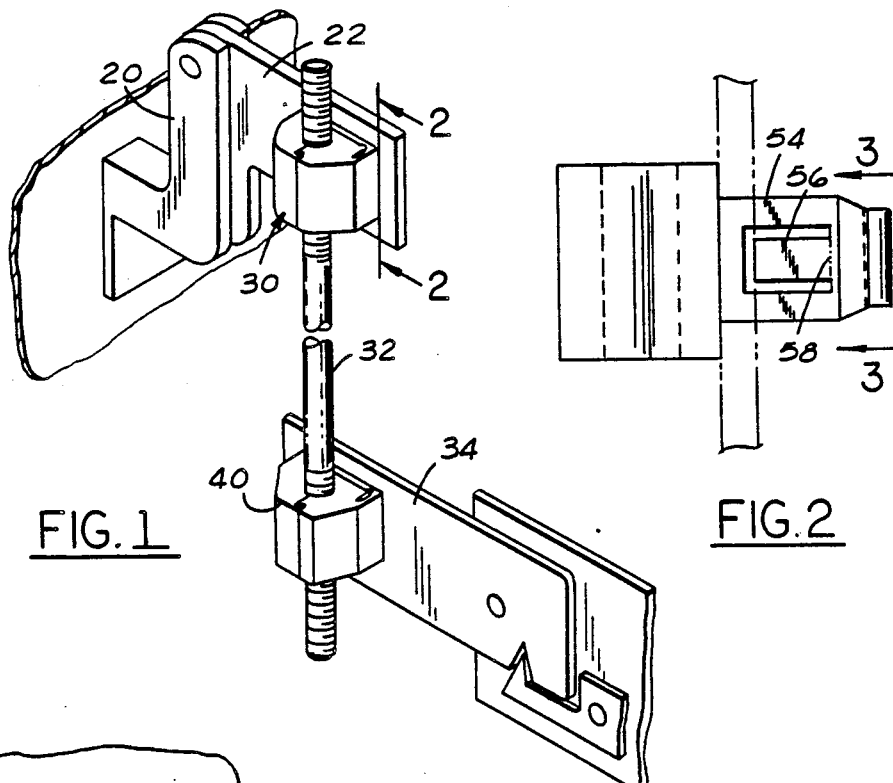
FIG. 1
FIG. 2
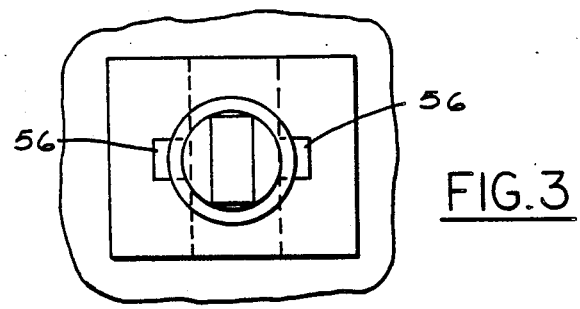
FIG. 3
FIG. 4
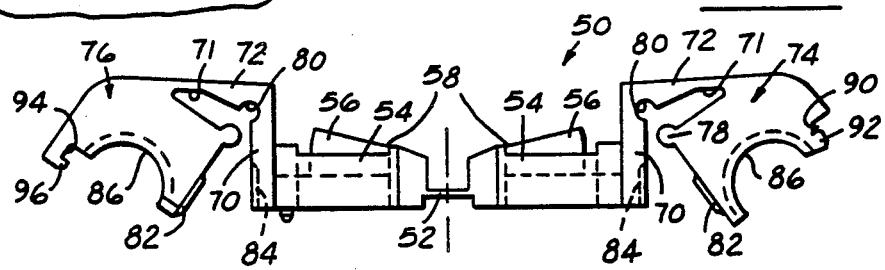
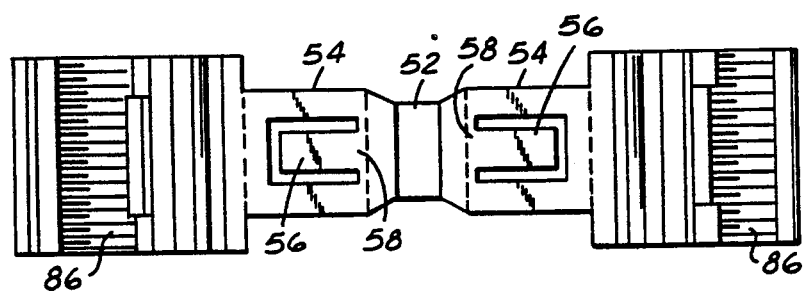
FIG. 5

SELF-LOCKING RETAINER CLIP

FIELD OF INVENTION

Clips used in manufacturing assembly procedures to fasten elongate parts with a simple push-in motion.

BACKGROUND AND FEATURES OF THE INVENTION

In the assembly of parts, such as threaded rods, in manufacturing procedures, it is an object to reduce the manual steps an operator must perform. If tools are needed, the operation takes time and there is a danger that inexperienced or careless workers may not always secure the parts properly.

The present invention is directed to a retainer clip that may be locked around a rod by simply pushing the rod in a direction transverse to its axis into the clip. The pushing action causes the clip to surround and clamp the rod while locking itself into a secure position. This is not simply using a U-shaped spring clip commonly used for holding tools and kitchen utensils. The clip, according to the present invention, encircles the rod and locks together with the rod enclosed.

An advantage of the retainer clip to be described is that it can be determined at a glance whether it is properly secured. Accordingly, when it is later enclosed, as within a vehicle door, there is a reduced chance of an assembly error.

Another object and advantage of the clip retainer is that as a one-piece unit, it has retention devices which support the clip in a panel recess with a simple push-in movement. Assembly time is thus reduced to a minimum with no tools required.

Objects and features of the invention will be apparent in the following description and claims in which the invention is set forth together with details to enable persons skilled in the art to practice the invention all in connection with the best mode presently contemplated for the invention.

BRIEF DESCRIPTION OF THE DRAWINGS

DRAWINGS accompany the disclosure and the various views thereof may be briefly described as:

FIG. 1, a perspective view of an exemplary assembly in which the self-locking retainers are used.

FIG. 2, a side view of a retainer on line 2—2 of FIG. 1.

FIG. 3, a rear view of the assembly on line 3—3 of FIG. 2.

FIG. 4 an end view of the retainer as a unitary molded part.

FIG. 5, a plan view of the retainer in open position as seen also in FIG. 4.

DETAILED DESCRIPTION OF THE INVENTION AND THE MANNER AND PROCESS OF USING IT

Figure 6:
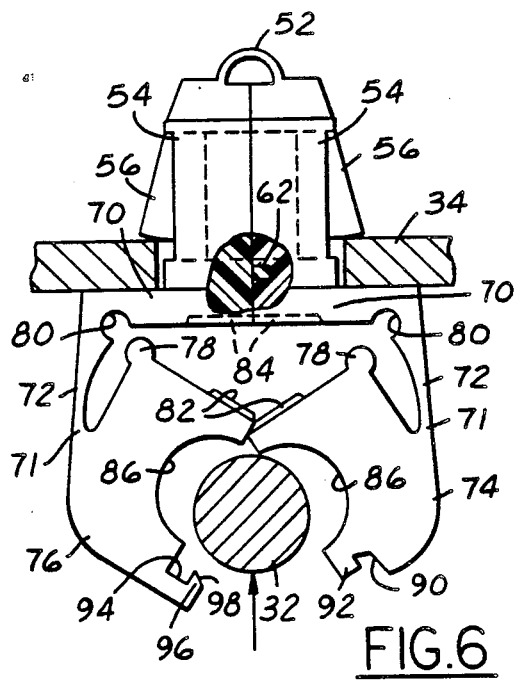
FIG. 6, a top view of the retainer, located on a support panel and partially closed.

With reference to the drawings, in FIG. 1, an assembly is shown utilizing two of the retainer clips of the present invention. A door handle mechanism carries a bracket 20 which supports a pivoted plate 22 which, in turn, carries a clip 30 clamping a shaft 32. A latch plate 34 on the door mechanism also carries a clip 40 which is clamped around the lower end of the shaft 32.

Figure 7:
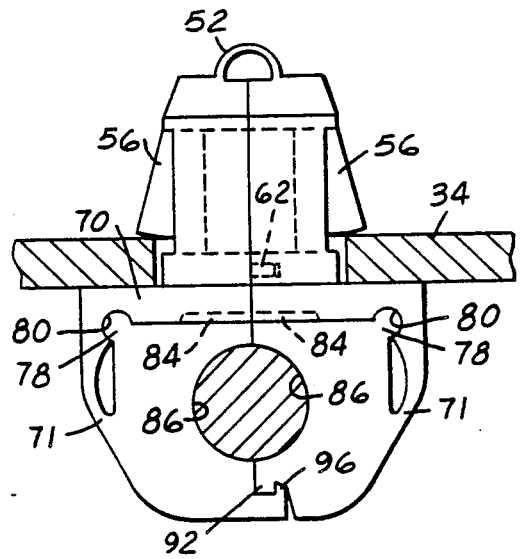
FIG. 7, a top view of the retainer as viewed in FIG. 6 but completely closed and locked.

The clip 50 shown in FIG. 4 is a one-piece plastic molded element which consists essentially of two almost identical parts connected by a living hinge 52. On each side of the hinge are retention mount blocks 54 which are formed with resilient side dogs 56 surrounded by U-shaped openings which allow movement of the dogs around a flexible base 58. When the blocks 54 are brought together, they form a plug as shown in FIGS. 6 and 7 which can be pushed through an opening 60 in plate 34. The dogs 56 will flex in and push through the opening and then spring out to lock the plug in the hole. An alignment plug 62 on one block 54 inserts into a registering recess on the outer block to properly align the blocks.

Self-locking elements are formed on the mount blocks 54. Each of these elements is comprised of base plate 70 with an extension 72 at right angles to the plates 70. Connected by a flexible neck piece 71 to the extensions 72 are closure jaws 74 and 76. These jaws are similar in respect that each has a corner detent 78 which inserts into a detent recess 80 in the corner between plate 70 and extension 72 (FIGS. 6 and 7). Also, each block 74,76 has a flat projection 82 which inserts into a shallow recess 84 on the inner surface of the plates 70 in the closed position of FIG. 7. Each jaw has a semi-circular recess 86 to receive and retain a rod 32.

The closure jaws 74,76 differ in that jaw 74 has an end locking recess 90 inside a projection 92. Jaw 76 has an end locking recess 94 inside a projection 96. These recesses and projections are spaced so that they interlock as shown in FIG. 7 in the closed position at the same time the detents 78 insert into recesses 80. The projection 96 has an angled surface 98 over which the projection 92 can cam into the recess 94.

The unit is self-locking. When the rod 32 is pushed into the locking jaws against the ends of the block opposite the projections 82, the jaws 74,76 are brought together around the rod 32 and the detents 78 will seat and the projections 92, 96 will seat into the recesses 94,90. Thus, the pressing insertion of the rod 32 closes and blocks the jaws together. Accordingly, the lock-in is visibly secure when the jaws lock. No tools are required for the assembly.

It is preferred that the rod 32 be serrated or threaded but the surfaces of the recess 86 may also be serrated to insure positive clamping on the rod and avoid any slippage.

Figure 8:
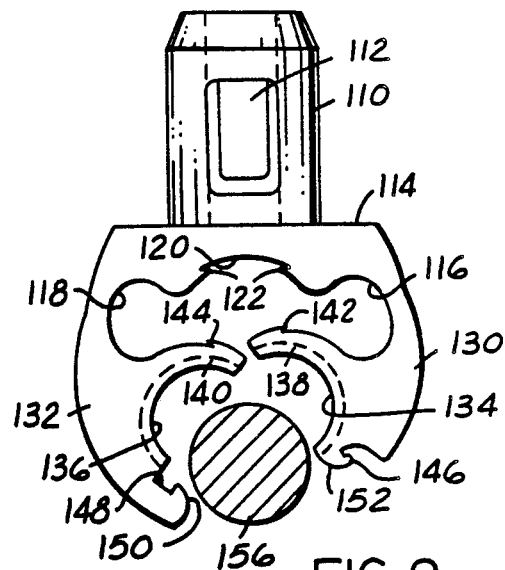
FIG. 8, a view similar to FIG. 6 of a modified clip retainer in a partially closed position.
Figure 9:
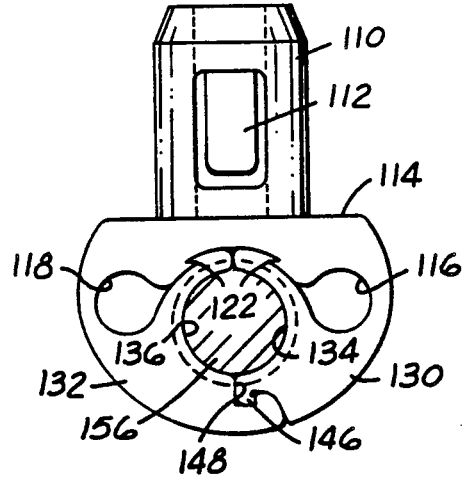
FIG. 9, a view of the retainer of FIG. 8 in a fully closed position.

In FIGS. 8 and 9, a modified retainer is illustrated with a mounting shank 110 having a retention clip 112. The retainer can be a one-piece molding having a flat back surface 114. Forward of the back surface is a symmetrical recess with rounded ends 116 and 118 and a central enlargement 120 between the ends. Two small hook projections 122 are formed on each side of the central enlargement pointing inwardly.

Below the recess ends 116, 118 are opposed clamping jaws 130 and 132 each having semi-circular recesses 134 and 136. The inner surfaces of the recesses are preferably serrated. Arcuate extension elements 138 and 140 on the base side, which are positioned below the recesses 116 and 118, have hook projections 142 and 144 pointing outwardly. At the lower inner ends of the jaws 130 and 132 are interengaging parts, namely, a detent projection 146 and a detent recess 148. Curved surfaces 150 and 152 allow the detent 146 to cam over into the recess 148. A rod 156 to be secured is positioned in the gap leading to the recesses 134 and 136.

When the rod 156 is pushed into the retainer against the extensions 138,140. These extensions are forced inwardly so that the hook projections 142 and 144 engage the projections 122 and lock in place. At the same time the jaws 130 and 132 are brought together and the detent 146 snaps into the detent recess 148 so that these parts interegage the closed retainer is illustrated in FIG. 9 secured tightly around the rod 156.

What is claimed is:

1. A self-locking retainer to be actuated to a closed position when an element to be retained is pushed into the retainer which comprises:
   (a) a base member having opposite ends and to be supported on a structural element,
   (b) opposed closure jaw members hingedly attached to opposite ends of said base member, each said jaw member having two spaced elements to define a recess to embrace a part of a member to be supported, including a first inner set of said spaced elements on the base member side of said respective jaws, and a second outer set of said spaced elements on the side of said jaws opposite said base member,
   (c) engageable means on said first set of elements and on said base to interlock in the closed position of said retainer,
   (d) spaced detent recesses and projections on said outer set of elements to interengage and interlock in the closed position of said retainer, and wherein
   (e) said base member is comprised of two molded block sections having outer ends hinged together and said opposed jaw members are hingedly connected to said respective block sections and positioned in opposed relation when said block sections are folded together.

2. A self-locking retainer as defined in claim 1 in which in the open position of said retainer, an opening is provided between said base and said first inner set of said spaced elements.

3. A self-locking retainer as defined in claim 1 in which said engageable means on said first set of elements, and on said base comprise detent openings in said base and detent projections on said first set of elements to snap into said detent openings.

4. A self-locking retainer as defined in claim 1 in which said engageable means on said first set of elements and said base comprise hook recesses and flexible hooks which snap together to interlock.

5. A self-locking retainer as defined in claim 1 in which said detent projection on said outer set of elements have angled camming surfaces to facilitate the interlocking of said projections and said recesses.

6. A self-locking retainer element as defined in claim 1 in which retention mounting means are attached to said base means on the side opposite said closure jaws having opposed resilient dogs to enter a hole in a mounting plate and retain said base means in said plate.

7. A self-locking retainer as defined in claim 1 in which said split base member and said closure jaws are molded as a single piece which fold together to form the base and the opposed closure jaw members.

8. A self-locking retainer element and retention mounted means formed as a single molded piece which comprises:
   (a) a pair of identical block means hinged together by a connecting hinge portion at one end and having resilient dogs formed thereon, said blocks, when folded together around said hinge portion, forming a mounting means insertable through a hole in a mounting plate,
   (b) a pair of mounting bases integral with said block means movable together when said blocks are folded together to form a base means to lie adjacent a mounting plate,
   (c) jaw means hinged to said base means having open recesses to form an enclosure when said jaw means are brought together, and
   (d) interlocking means on said jaw means and said base means to lock said jaws together when said jaws are pushed together over said base means.

* * * * *